United States Patent [19]

Taylor, Jr.

[11] 4,231,005
[45] Oct. 28, 1980

[54] CONSTANT FALSE ALARM RATE RADAR SYSTEM AND METHOD OF OPERATING THE SAME

[75] Inventor: John W. Taylor, Jr., Baltimore City, Md.

[73] Assignee: Westinghouse Electric Corp., Pittsburgh, Pa.

[21] Appl. No.: 55,889

[22] Filed: Jul. 9, 1979

[51] Int. Cl.³ .............................................. G01S 13/02
[52] U.S. Cl. ............................... 343/5 NQ; 343/5 CF
[58] Field of Search ........................... 343/5 CF, 5 NQ

[56] References Cited

U.S. PATENT DOCUMENTS

| | | | |
|---|---|---|---|
| 3,727,227 | 4/1973 | Takao et al. | 343/5 NQ X |
| 3,757,331 | 9/1973 | Moulton | 343/17.2 PC X |
| 3,887,918 | 6/1975 | Bailey | 343/17.2 R |
| 3,962,704 | 6/1976 | Evans | 343/5 NQ X |
| 3,972,041 | 7/1976 | Howard | 343/7.7 |
| 3,987,442 | 10/1976 | McLeod, Jr. | 343/7.7 |
| 4,005,417 | 1/1977 | Collins | 343/5 NQ X |
| 4,132,990 | 1/1979 | DiDomizzo et al. | 343/5 NQ X |
| 4,137,533 | 1/1979 | Brzzechle et al | 343/5 NQ X |

Primary Examiner—Malcolm F. Hubler
Attorney, Agent, or Firm—W. E. Zitelli

[57] ABSTRACT

In a radar which transmits a phase-coded train of subpulses and which derives the in-phase (I) and quadrature (Q) components of the received echo signals with respect to a local reference oscillator is embodied a phase discrimination constant false alarm rate (CFAR) system partially comprising a phase angle sensor for measuring the phase angle of the echo signal as one of at least eight predetermined phase angle representations, which are characterized preferably by binary numbers in Gray format, based on the relative magnitudes and polarities of the I and Q components of the echo signal. The phase angle representations may correspond exclusively to phase angle increments in the phase angle interval of 0° to 360° with respect to the local reference oscillator. Preferably, the phase angle increments are evenly partitioned within the 360° interval. When encountering an ambiguous borderline condition in the measurement of the phase angle of the echo signal, the sensor resolves the ambiguity with a systematic rotational assignment of phase angle representation which may be either consistently clockwise or consistently counterclockwise dependent on the choice of embodiments. Under the extreme anbiguous condition when the magnitudes of both the I and Q components of the echo signal are detected at substantially zero, a phase angle representation is selected from a randomly generated neutral pattern of phase angle reperesentations which, for the embodiments disclosed, are 3-bit binary numbers in Gray format.

32 Claims, 6 Drawing Figures

CONSTANT FALSE ALARM RATE RADAR SYSTEM AND METHOD OF OPERATING THE SAME

BACKGROUND OF THE INVENTION

The present invention relates broadly to radar systems which employ constant false alarm rate (CFAR) receivers based on phase discrimination logic and more particularly, to a CFAR decoder for use therein having improved sensitivity in the detection of desired echos in the presence of undesired echo interference or receiver noise.

Phase discrimination CFAR's are widely employed in the radar field to prevent a significant increase in false alarm rate (FAR) when interference, such as rain, chaff, active jamming or pulses from other radars, for example, are encountered. For more detail description of the principles of CFAR, reference is made to section 5.8 of the Radar Handbook which was edited by M. I. Skolnick (McGraw-Hill, 1970). For the purposes of this application, it will only be necessary to consider those CFAR processes which discriminate between desired and undesired echos solely on the basis of the phase patterns of the signal content that is received in relation to that which is transmitted. The objective of the phase discrimination type CFAR is to control the false alarm rate in noise or any random-phase interference, independent of both the mean amplitude of the interference and its amplitude distribution. Desired echos are detected in the presence of undesired interference, for the most part, by how well the phase code of the desired echos correlates with the phase code of the signal transmitted.

Phase discrimination CFAR is often called "Dicke-fix CFAR" when the radar transmits a pulse having essentially constant phase throughout and "CPACS (Coded Pulse Anti-Clutter System)" when a series of contiguous sub-pulses are transmitted, having a desirable phase pattern. The receiver implementation may be the same in either case; however, because the performance of CPACS in many types of interference is superior to Dicke-fix CFAR, it is more widely used. Where the term CPACS is employed in the following discussion, it should be understood that Dicke-fix CFAR is also implied.

In most modern radars, the CPACS is generally preceded by a linear, wide-dynamic range doppler filter or MTI, usually of the digitally implemented variety, which operates on the received radar echo signal and generates two signals, I and Q, which are representative of the in-phase and quadrature components of the echo vector, normally denoted by A cos $\phi$ and A sin $\phi$, respectively, where A is the amplitude of the signal and $\phi$ is the phase relative to a conventional local reference oscillator. Existing digital CPACS designed for MTI or doppler-type radar processors generally utilize only one of the two echo vector components, I and Q. Exemplary of this type of CPACS is the one disclosed in U.S. Pat. No. 3,887,918, issued to John S. Bailey et al on June 3, 1975. The sacrifice in sensitivity encountered in the operation of these one-bit CPACS decoders was tolerated in the early days of radar signal processing in order to maintain the cost of the MTI system to a reasonable level. However, more recently CPAC systems have been developed which make use of both the I and Q vector components of the echo signals, primarily due to the reduction in cost and size of the electronic components used in the design thereof. In these CPAC systems, the polarities of the I and Q vector components are used to measure the phase pattern of the coded echo signal in 90° segments, thus potentially providing a higher degree of sensitivity over that of the one-bit decoders in discriminating the desired echo signals from interference. CPACS decoders of this type may be described as quadraphase or 2-bit designs.

While it is recognized that the 2-bit CPACS designs significantly improve the sensitivity of the radar system, it is further believed that the full benefits-cost ratio (dB/$) has not yet reached an optimum with respect to additional discrimination inherent in the phase pattern of the coded echo signals. For example, it can be shown that a sensitivity improvement of 0.6 dB can be achieved by increasing the phase quantization from a 2-bit design to a 3-bit design. It is therefore applicant's intention to disclose herebelow such a 3-bit CFAR system having an improvement in sensitivity and a favorable benefit-cost ratio.

SUMMARY OF THE INVENTION

The present invention relates to a phase discrimination CFAR system included in a radar which transmits a phase-coded train of sub-pulses and which derives the in-phase (I) and quadrature (Q) components of the received echo signals with respect to a local reference oscillator. Apparatus relating to one aspect of the invention comprises a phase angle sensor which utilizes the relative polarity and magnitude of the derived I and Q components of the echo vector to measure the phase angle thereof as one of at least eight predetermined phase angle representations; means for sampling the derived phase angle representations at times corresponding to the sub-pulse spacing of the transmitted signals; first means for deriving the difference in phase angle representation between that sampled and that transmitted for the intervals of the sub-pulse phase coded pattern; second means for deriving the sine and cosine values of the derived differences in phase angle representations; second means for accumulating the derived sine values corresponding to the sub-pulse intervals of the phase coded pattern and for accumulating the derived cosine values corresponding to the sub-pulse intervals of the phase-coded pattern; and third means for deriving a signal which is representative of the correlation of the phase pattern of the echo signal with the phase pattern transmitted based on a function of the accumulated derived sine and cosine values.

More specifically, the phase angle of the received echo signal is measured as one of the at least eight predetermined phase representations, preferably corresponding exclusively to phase angle increments in the phase angle interval of 0° to 360°, with a systematic rotational assignment when encountering an ambiguous borderline condition. Under the extreme ambiguous condition of the magnitude of both the I and Q components of the echo vector being substantially zero, a phase angle representation is selected with substantially equal probability from a generated neutral pattern of phase angle representations. The measured phase angle representations may be characterized by a 3-bit binary number, preferably of Gray format, wherein each of the eight representations may correspond exclusively to a phase angle increment evenly partitioned from the phase angle interval of 0° to 360°.

DESCRIPTION OF THE PREFERRED EMBODIMENT

The present invention is disclosed best in connection with a pulse compression type radar similar to the type described in Section 20.1 of the above-referenced Radar Handbook. One special type of pulse compression transmitted signals are referred to as phase coded waveforms and are described in some detail in Section 20.5 of the same Radar Handbook. The aforementioned Section 20.5 refers primarily to binary phase coded signals, like the Barker codes which are shown in Table 5, for example, and to polyphase codes. Generally speaking then, radars of the coded phase type are operative to radiate a train of sub-pulses having a predetermined phase-coded pattern, the Barker codes being one example of such phase-coded pattern. Another, which is known to have certain characteristics superior to Barker codes, is of the variety being commonly termed quadraphase, wherein the radar transmitted waveform may be segmented into a plurality of phase coded intervals of 0°, 90°, 180°, or 270°.

Working in conjunction with the phase coded pulse transmitter may be an MTI or pulse doppler-type radar receiver. These receivers generally include a local reference oscillator which is used to convert the received echo signals down to a base band frequency range and in addition, derive the in-phase I and quadrature Q vector components of the received echo signals, each being based on a common phase angle with respect to the local reference oscillator. For a more detailed description of a radar system of this variety, reference is made herein to the U.S. Pat. No. 3,797,017, issued to John W. Taylor, Jr. on Mar. 12, 1974 and assigned to the same assignee as the present application. Generally these I and Q components are sampled at intervals corresponding to the sub-pulse spacing and may be converted into digital representation for subsequent processing. Sampling at a higher rate is possible, and provides additional improvement in sensitivity, as is well known. The description which follows will assume that the sampling interval corresponds to the sub-pulse spacing to simplify the description, but there is no intention to restrict the invention to the parameter choice.

As was described above in the Background section, most of the phase coded pulse transmission type radars include a constant false alarm rate (CFAR) type processor for use in the discrimination between desired echos and interference. Of particular interest to the present invention is the type of CFAR which employs phase discrimination techniques in which the receiver discriminates between desired echos in the presence of interference solely by the variation with time of the phase coded pattern of the received echo signals as correlated with the phase coded pattern of the transmitted signal corresponding thereto. A portion of CFAR receiver processor, one which is more commonly termed coded pulse anti-clutter system CPACS, is preferably used to embody the present invention as shown in FIG. 1.

Figures 1, 2:
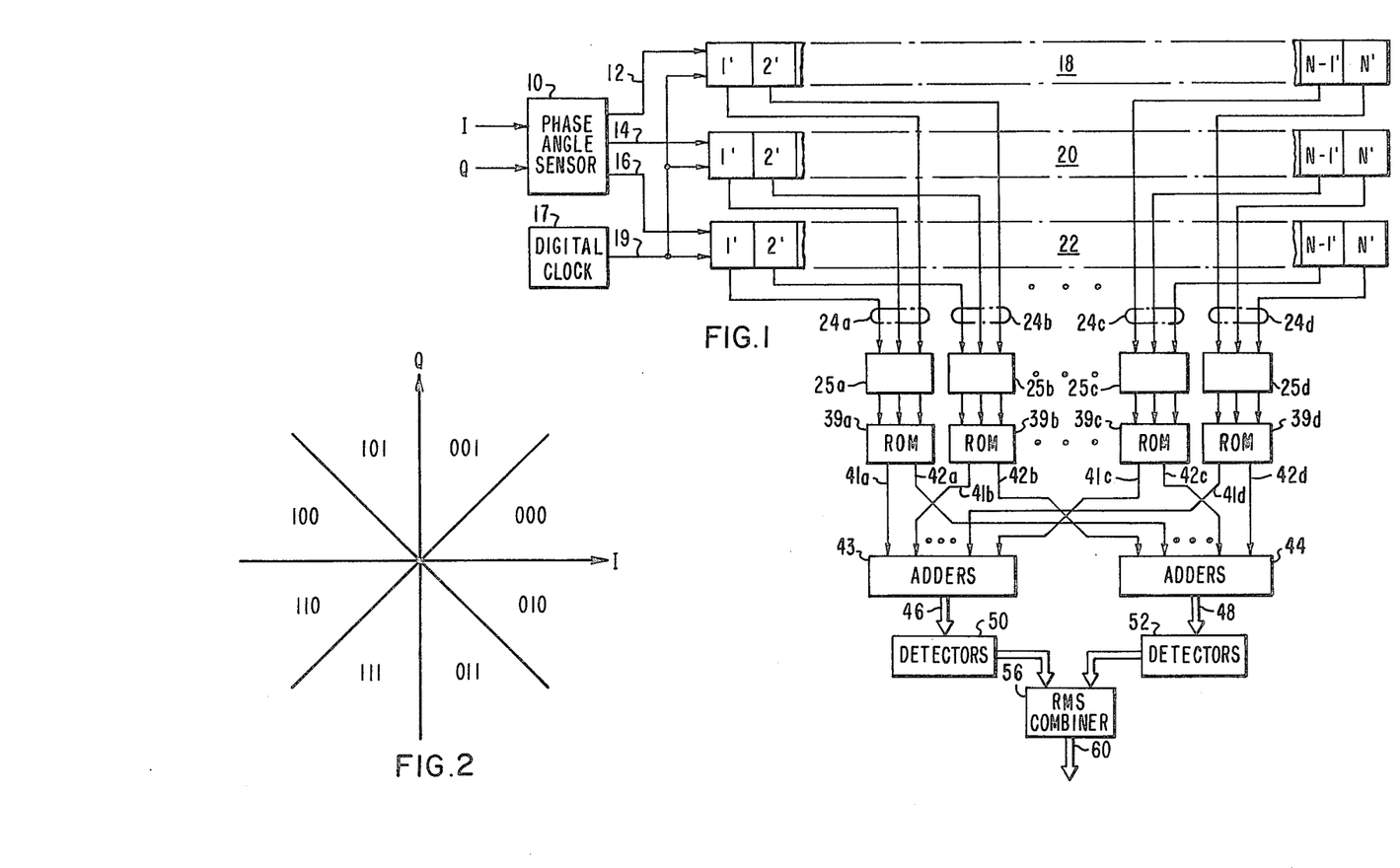
FIG. 1 is a block diagram schematic of a phase discrimination CFAR system suitable for embodying the principles of the present invention.
FIG. 2 is a graph of I and Q cartesian coordinates which is illustrative of eight phase angle segments partitioned from an interval of 0° to 360°, each segment being characterized exclusively by a 3-bit binary number in Gray format.

Referring to FIG. 1, the I and Q components of the echo vector which are normally derived by the MTI or doppler-type processor (not shown) are coupled as inputs to a phase angle sensor 10. The phase angle sensor 10 functions to measure the phase angle of the echo vector at any point in time into one of at least 8 predetermined phase angle representations based on the relative polarity and magnitude of the input I and Q signals. As an example, FIG. 2 depicts 8 evenly partitioned phase angle segments in a phase angle interval of 0 to 360 degrees with respect to the local reference oscillator (not shown) and their corresponding phase angle representations in binary numbers which, in the preferred case, may be in Gray format.

Figure 3:
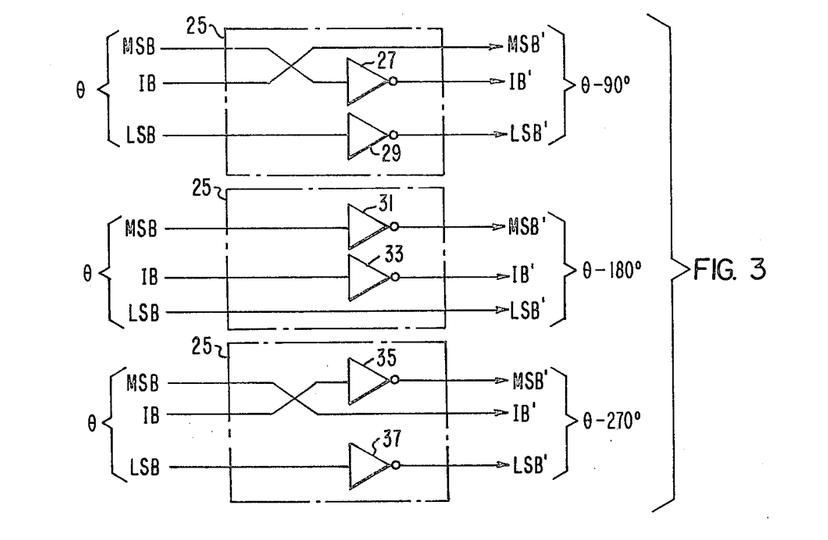
FIG. 3 is a circuit schematic embodiment suitable for use in the code compensations of FIG. 1.

The 3-bit binary number in Gray format, for example, representative of the measured phase angle, may be output from the phase angle sensor 10 over signal lines 12, 14 and 16 and coupled to the first stage of three respectively corresponding shift registers 18, 20 and 22. The shift registers 18, 20 and 22 may be synchronously clocked at predetermined sampling times by a conventional digital clock 17 in time relationship to the sub-pulse spacing of the pulse transmissions to incrementally input and shift the derived digital phase data therethrough in common indexed positions 1', 2', ... (N-1)', N'. These shift registers 18, 20 and 22 may have a capacity of indexed positions N' which is commensurate with the duration of the transmitted train of subpulses. A predetermined number of the common index positions of the shift registers 18, 20 and 22 are tapped to extract the digitally coded phase angle information therefrom. The extracted phase angle information is coupled over signal lines 24a, 24b, ..., 24c and 24d to a corresponding plurality of code compensators 25a, 25b, ... 25c, and 25d which are used to facilitate the derivation of the difference in phase angles between the representation extracted from the shift registers and a representation of that correspondingly transmitted by the radar transmitter. An example of this code compensation for the transmitted phase angle codes of 90°, 180°, and 270°, is shown in FIG. 3. This example relates only to the case when the phase angle binary number representations are in the preferred Gray format.

The embodiment of FIG. 3 utilizes digital inversion and signal reorganization techniques to perform the subtraction function. For example, when the phase angle 90° is to be subtracted from the sampled or extracted phase angle representations of the shift registers, the most significant bit MSB is inverted by a conventional inverter 27 and reorganized to be the output intermediate bit IB'. The input intermediate bit IB is reorganized to become the output MSB', and finally, the input least significant bit LSB is inverted by a conventional inverter 29 to become the output LSB'. In the case in which the phase angle representations of 180° is to be subtracted from the extracted phase angle representations of the shift register, the input MSB may be inverted by a conventional inverter 31 to become the output MSB'. In addition, the input IB may also be inverted by a conventional inverter 33 to become the output IB', and finally, the input LSB is passed without modification to the output LSB'. For the third case, in which the phase angle representation for 270° is to be subtracted from the extracted phase angle representations of the shift register, the input MSB is reorganized to become the output IB'. The input IB may be inverted by a conventional inverter 35 to become the output MSB', and finally, the input LSB may be inverted by an inverter 37 to become the output LSB'.

The binary number MSB', IB', and LSB' which is representative of the difference in phase angle representations between that extracted from the predetermined common index positions of the shift registers and that transmitted in a respectively corresponding phase coded sub-pulse interval are respectively coupled to corresponding read only memory devices 39a, 39b, . . . , 39c, 39d as the address inputs thereof. Each of the read only memories 39a, 39b, . . . , 39c and 38d are of the conventional permanently programmable type whose registers may be pre-programmed in natural binary format which characterize the trigonometric sine and cosine identities of the differences in phase angle codes which are coupled to the address inputs thereof. Illustrative of the programming in either 3-bit or 4-bit natural binary format for the sine and cosine characterizations is the tabulation of codes shown in Table 1 found below.

TABLE 1

TRIGONOMETRIC ROM VALUES

| Gray Format Angle | Natural Binary Format Outputs | | | |
|---|---|---|---|---|
| | Cosine | | Sine | |
| ROM Address | 3 Bit | 4 Bit | 3 Bit | 4 Bit |
| 0 0 0 | *0 1 1 | *0 1 1 1 | *0 0 0 | *0 0 0 0 |
| 0 0 1 | 0 1 0 | 0 1 0 1 | 0 1 0 | 0 1 0 1 |
| 1 0 1 | 0 0 0 | 0 0 0 0 | 0 1 1 | 0 1 1 1 |
| 1 0 0 | 1 1 0 | 1 0 1 1 | 0 1 0 | 0 1 0 1 |
| 1 1 0 | 1 0 1 | 1 0 0 1 | 0 0 0 | 0 0 0 0 |
| 1 1 1 | 1 1 0 | 1 0 1 1 | 1 1 0 | 1 0 1 1 |
| 0 1 1 | 0 0 0 | 0 0 0 0 | 1 0 1 | 1 0 0 1 |
| 0 1 0 | 0 1 0 | 0 1 0 1 | 1 1 0 | 1 0 1 1 |

*Polarity Bit of 2's Complement Output Word

It is understood that the programming of these type read only memories is well known to anyone of ordinarily skill in the art and that there is no need to describe this portion of the embodiment in any greater extent. The outputs from the ROM devices representative of the trigonometric sine identities of the phase angle differences are coupled to a conventional organization of digital adders denoted by block 43 over signal lines 41a, 41b, . . . , 41c and 41d for the accumulation thereof. Likewise, the outputs representative of the trigonometric cosine identities of the difference in phase angle codes are coupled to another similar conventional organization of digital adders denoted by block 44 over signal lines 42a, 42b, . . . , 42c, and 42d for the accumulation thereof.

The configuration of digital adders denoted by block 43 may be any one of the well-known parallel-type or serial-type structures which produce an accumulation of the N' sine representations over signal line 46. In a similar manner, the digital codes representative of the trigonometric cosine values may be accumulated in a similar well-known configuration of adders denoted by block 44 to provide a total sum of the N' cosine representations over signal line 48. The total sum signals 46 and 48 are coupled to functional blocks 50 and 52, respectively. The functional blocks 50, 52 and 56, in combination, are generally well known in the art to function as an RMS combiner often used to provide an approximation of $$\sqrt{\left[\sum_{j=1}^{N'} \cos(\phi_j - \theta_j)\right]^2 + \left[\sum_{j=1}^{N'} \sin(\phi_j - \theta_j)\right]^2} \quad (1)$$

where $\phi_j$ may be the sampled phase angle of the echo signal which is stored in the index position (j) in the shift registers, and $\theta_j$ may be the corresponding phase angle applied to the transmitted signal. The above approximation relates to a measure of the desired echo signal in relationship to the presence of undesired echo interference based on a function of the accumulated derived trigonometric sine and cosine values of the N' differences $(\phi_j - \theta_j)$ of phase angles. A digital signal 60 derived by the RMS combiner comprising 50, 52 and 56 is representative of the approximation of this measure.

In operation, the I and Q components of the received echo vector are derived as a time function and provided to the phase angle sensor 10. The phase angle sensor 10 measures the phase angle of the I and Q echo vector components as one of at least 8 predetermined phase angle segments such as that shown by the graph in FIG. 2, each phase angle segment being denoted by a binary number in Gray format, for example. The binary Gray format representations of the measured phase angles are provided to the input of the shift registers 18, 20 and 22 over the signal lines 12, 14 and 16, respectively. The digital clock 17 clocks at predetermined sampling times each of the shift registers using signal line 19 synchronously in time relationship to the phase coded sub-pulse intervals of the pulse transmissions. The measured phase angle representations are input and shifted through the shift registers in predetermined common indexed positions accordingly. A predetermined number of phase angle binary number representations commensurate with the number and spacing of sub-pulses of the transmission waveform are extracted from the shift registers. In the code compensators 25a, 25b, . . . , 25c and 25d, the phase angles associated with the phase-coded sub-pulse transmission are subtracted from the extracted phase angle representations respectively corresponding thereto. Thereafter, the trigonometric sine and cosine identities of each of the corresponding difference in phase angle representations are derived in the read only memories 39a, 39b, . . . , 39c and 39d. The derived sine identities are accumulated in the configuration of adders in block 43 and the derived cosine identities are accumulated in the configuration of adders in block 44. In each case, the accumulated signals 46 and 48 are operated on by the combination of functional blocks 50, 52, and 56 to produce a digital output signal 60 which is the approximation of the RMS formula (1) as shown above. In one operational case, a new digital signal at 60 may be calculated each time the shift registers 18, 20 and 22 are updated with a newly measured phase angle segment from signal lines 12, 14 and 16. However, this may not always be the case.

Figure 4:
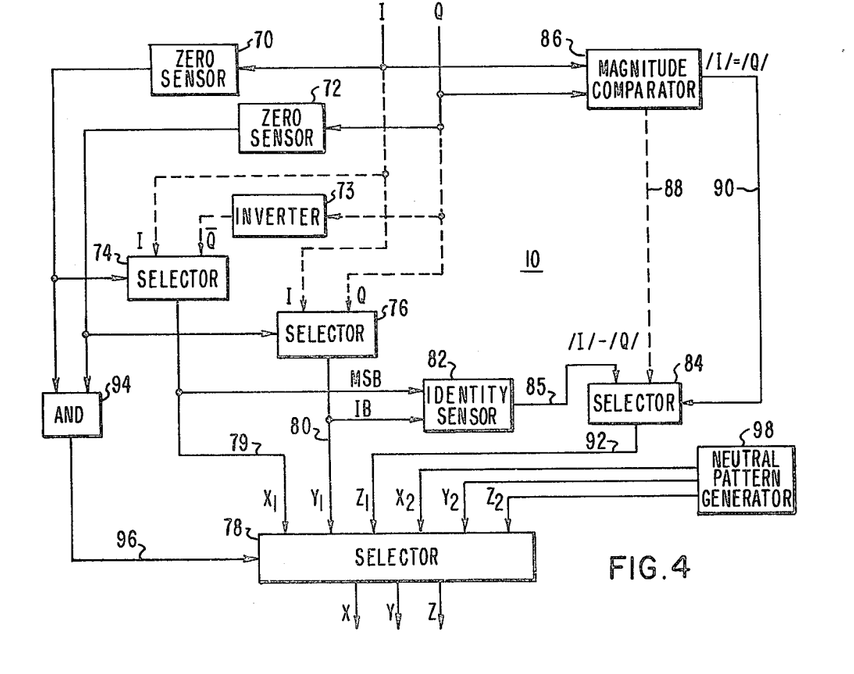
FIG. 4 is a functional block diagram schematic of a phase angle sensor suitable for use in the embodiment of FIG. 1.

A more detailed description of a phase angle sensor 10 suitable for use in the embodiment of FIG. 1 will be provided below in connection with the functional schematic diagram shown in FIG. 4. Referring to FIG. 4, the time waveforms of the I and Q components which for the purposes of describing the embodiment of FIG. 4, may be assumed to be in digital form. The dotted lines shown in FIG. 4 denote only the polarity bit of the digital signals representative of the time waveforms of the I and Q components. The digital representations of the I and Q time waveforms are respectively provided to the inputs of zero sensors 70 and 72. The polarity bit of the vector I is provided as one input to the selector functional blocks 74 and 76. The other input of the functional selector blocks 76 and 74 is the normal and inverted polarity bit of the Q component respectively. The output of the zero sensor 70 is provided to govern the selection of one of the two inputs of the selector functional block 74 and likewise the output of the zero sensor function 72 is provided to govern the selection of one of the two inputs of the selector functional block 76.

The digital bit outputs of the selector functional blocks 74 and 76 are representative, at times, of the most significant bit (MSB) and the intermediate bit (IB) of the digital binary number representation of the resolved phase angle segment (refer to FIG. 2). These two signals are respectively provided to the $X_1$ and $Y_1$ inputs of another selector functional block 78 utilizing signal lines 79 and 80. In addition, the MSB and IB signals are also provided to an identity sensor functional block 82. The digital bit output of the identity sensor 82 is provided to a fourth sensor functional block 84 over signal line 85.

Additionally disposed within the phase angle sensor 10, is a digital magnitude comparator 86 which compares the relative magnitudes of the I and Q components sampled at the same time for both an equality condition and to determine the polarity of their difference. The polarity of the difference between the magnitudes of I and Q components is provided to the selector functional block 84 over signal line 88. That which governs the selection of one of the two inputs of the selector functional block 84 is an equality condition signal determined by the digital magnitude comparator 86 and provided to the selector functional block 84 over line 90. The output of the selector functional block 84 is provided to the $Z_1$ input of the selector functional block 78 over signal line 92.

A conventional neutral digital pattern generator 98 is also disposed in the sensor 10 to independently generate the eight 3-bit binary number representations of the phase angle segments. The purpose of this is to have the phase binary numbers generated with an equal probability which may be accomplished in any one of a number of conventional ways including randomly generating the numbers, pseudo randomly generating the numbers, or periodically generating the numbers in a sequence which produces a lower alarm rate after decoding and subsequent integration. The 3-bit output binary number generated by the pattern generator 98 is coupled to the $X_2$, $Y_2$, and $Z_2$ inputs of the selector functional block 78. In addition, the outputs of the zero sensors 70 and 72 are both coupled as inputs to an AND functional block 94, the output of which is used as the selection governing input to the selector functional block 78 provided thereto over signal line 96. The governing control input 96 selects X, Y, Z from selector functional block 78 one of the two 3-bit digital output signals $X_1$, $Y_1$, $Z_1$ or $X_2$, $Y_2$, $Z_2$ as the output binary number in Gray format, for example, which is representative of the phase angle segment within the interval of 360° such as that shown in FIG. 2.

Much of the functional schematic embodiment of FIG. 4 is provided for the purpose of detecting the ambiguous condition when the echo vector components I and Q fall on a borderline between the phase angle segments. In other words, when the phase angle value of the echo vector falls on one of the solid lines as shown in FIG. 2, the embodiment described above in connection with FIG. 4 is structured to define the phase angle of the received echo signal as one of the at least 8 predetermined phase angle representations based on a systematic angular rotational assignment, which for the exemplary embodiment of FIG. 4 is to always select the more counterclockwise phase angle segment with respect to the borderline phase angle value. In the extreme ambiguity case, like that when both the I and Q components are detected as being at substantially zero value, the output $X_2$, $Y_2$, $Z_2$ generated by the pattern generator 98 is selected as the measured phase angle. The pattern is chosen to minimize the probability of false alarm when echo input drops to a low value for any reason.

In describing the operation of the embodiment of FIG. 4, it is assumed that when the polarity of any signal I, Q, or I-Q is positive the polarity bit may be set zero; otherwise, the status of the polarity bit may be set one. In operation, then, when no ambiguous borderline condition is detected, that is, neither I nor Q components are determined to be substantially zero nor are they equal the selector functions 74 and 76 are governed to select the polarity of the components I and Q, respectively, as the $X_1$ and $Y_1$ inputs to the selector function 78. Likewise, if the I and Q components are unequal in magnitude, the selector function 84 is governed to select the polarity of the difference in magnitudes between I and Q to be the $Z_1$ input to the selector function 78. The selector function 78, in turn, is governed to select the $X_1$, $Y_1$, and $Z_1$ inputs as the measured phase angle representation in binary Gray format.

If the zero sensor 70 detects a zero which is indicative of a phase angle value falling on the ordinate of the graphs in FIG. 2, selector function 74 is governed to select the inverted polarity signal of the Q component, which is provided to the $X_1$ input of the selector function 78. Similarly, if the zero sensor 72 determines that its input is zero, which is indicative of the phase angle value falling on the abscissa of the graph of FIG. 2, the selector function 76 is governed to select the polarity of the I component as the $Y_1$ input to the selector function 78. Still further, if the magnitude comparator 86 establishes an equality condition indicative of the phase angle falling on one of the diagonal lines depicted in FIG. 2, then the selector function 84 is governed to select the polarity of the signal line 85 as the $Z_1$ input to the selector function 78. The polarity of the signal 85 is determined by the identity sensor 82. For example, if the MSB and the IB are determined to have equivalent polarities, the output signal 85 may be represented by a 1; otherwise, it may be represented by a 0.

In the extreme ambiguity case in which both zero sensors 70 and 72 detect zero inputs, which is indicative of an echo being substantially at the origin of the graph shown in FIG. 2, the AND function 94 detects this condition and governs the selector function 78 to select the digital number randomly generated by the pattern generator 98 as the Gray code representation of the phase angle.

It is understood that the functional elements shown in block form in FIG. 4 may be implemented with well known configurations of conventional digital gating circuitry. For example, the zero sensors 70 and 72 may be comprised of a well-known combination of digital gates like NOR and AND gates, for example. The selector functional blocks 74, 76 and 84 may also be a configuration of digital AND gates and OR gates wherein the enablement of the selected gate is determined by the outputs of the zero sensor circuit 70 and 72 and the output of the magnitude comparator function 86. The inverter 73 and AND function 94 may be simple one gate configurations and the identity sensor 82 may be nothing more than a two input exclusive NOR gate, for example. Furthermore, the digital magnitude comparator 86 may be comprised of a number of conventional MSI digital comparator circuits configured to provide an equality signal over line 90 and a polarity signal over line 88 representative of the sign of the difference of digital signal magnitudes of the I and Q components. The neutral pattern generator 98 may also be embodied in any of the well-known circuit configurations, the details of which in no way should be considered as part of the present invention. Still further, the selector function 78 may be comprised of another conventional MSI circuit which is capable of selecting one of two, 3 or 4-bit input digital words to be transferred to its output lines. These type integrated circuits are manufactured by many of the well known semiconductor manufacturers such as Texas Instruments, Motorola, ... etc.

Figure 5:
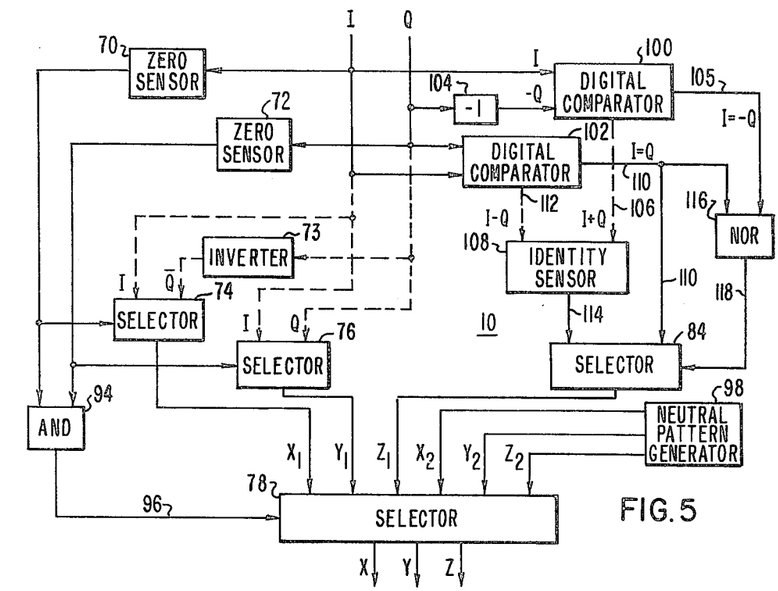
FIG. 5 is an alternate functional diagram schematic of a phase angle sensor suitable for use in the embodiment of FIG. 1.

An equally acceptable alternate embodiment of the phase angle sensor 10 which effects clockwise assignment of the phase angle segments with respect to ambiguous borderline decisions is shown in FIG. 5. The zero sensor 70 and 72, the inverter 73, the selector functions 74 and 76, the AND gate 94, the neutral pattern generator 98, and selector function 78 and 84 may all remain similar to that as shown in the embodiment of FIG. 4. Within the new structural arrangement in connection with the embodiment shown in FIG. 5, the digital word representative of the I vector component is provided, as one input, to a digital comparator 100 and, as one input, to another digital comparator 102. The second input of the digital comparator 102 is the digital word representative of the Q vector component. A digital conversion unit disposed in the sensor 10 is operative to convert the digital word Q into the digital word representative of $-Q$ which is supplied to the second input of the digital comparator 100.

The digital comparator 100 determines when the digital word I is equated substantially to the digital word $-Q$ and provides an equality signal over the signal line 105. In addition, the comparator 100 provides, over a signal line 106, the polarity of the sum of the digital words representative of the I and Q components which is provided to one input of an identity sensor 108. The second digital comparator 102 provides a signal over line 110 indicative of equality between the digital words representative of the I and Q component and in addition, provides a polarity signal over line 112 which is representative of the polarity of the difference between the digital words representative of the I and Q components. The polarity signal 112 is coupled to a second input of the identity sensor function 108. The output signal 114 of the identity sensor function 108 is provided to one input of the selector function 84 the other input to selector function 84 is coupled to signal line 110. A NOR function 116 having as inputs the signal lines 110 and 105 provides the governing signal 118 to the selector function 84. The output of the selector function 84 is the input $Z_1$ to the selector function 78.

The digital comparators 100 and 102 may be similarly comprised of a combination of digital gates configured in any one of the well known arrangements for application to digital comparison. The conversion circuit 104 may be similar to the type which performs a two's complement transformation of a digital word to its negative value which is also well known to any one skilled in the pertinent art. The identity sensor 108 may be nothing more than an exclusive NOR gate circuit determining the equality relationship between the polarities of the sum and difference of the I and Q components. And the NOR function 116 may be nothing more than a conventional NOR gate.

In the description of operation, it will only be necessary to relate to that which is different from the embodiment shown in FIG. 4 because of the similarity in operation of the common elements. The comparator 100 determines if the I component is equal to the $-Q$ component and denotes this over signal line 105; in addition, it determines the polarity of the sum of the I and Q components and provides the polarity thereof over signal line 106. Similarly, the digital comparator 102 determines the equality between the I and Q components and provides an indication thereof over signal line 110 and in addition, the difference between I and Q components is determined and the polarity thereof is provided over signal line 112 to the identity sensor 108. The NOR functions 116 determines if the I component is equal to neither the $-Q$ NOR the Q components which is indicative of the echo vector not being on one of the diagonal lines as shown in the graph of FIG. 2. Under these conditions selector function 84 selects signal line 114 to provide the status to the LSB $Z_1$. However, if the I component is equated to either the Q or the $-Q$ component values which is indicative of the echo vector being substantially on one of the diagonal lines as depicted in FIG. 2, then the NOR function governs the selector function 84 to select the status of the least significant bit $Z_1$ as the signal line 110. All of the other functions as depicted in the embodiment of FIG. 5 remain similar to that as shown and described in connection with the embodiment of FIG. 4.

To further illustrate that the angle sensor 10 is not limited to time varying waveforms of digital format representative of the I and Q vector components, a second alternate embodiment such as that shown in the functional schematic diagram of FIG. 6, for example, will be described pertaining to analog signal representations of the I and Q component values. The embodiment described in connection with FIG. 6 still provides a three bit binary number in Gray format being representative of a phase angle segment within the phase angle interval of 0° to 360° with the respect to the local reference oscillator such as that shown in FIG. 2. It is assumed however, in the embodiment of FIG. 6, that there will be no border line circumstances in resolving analog representations of the I and Q component values.

Figure 6:
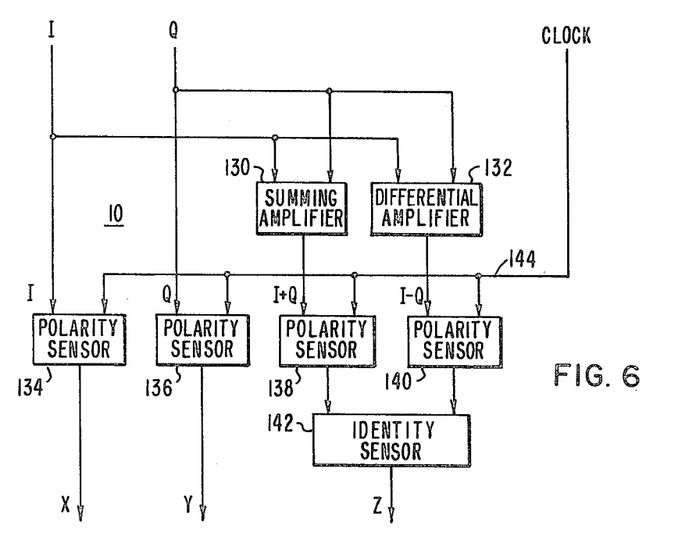
FIG. 6 is a functional diagram schematic of another phase angle sensor suitable for use in the embodiment of FIG. 1.

Referring to FIG. 6, the analog signal representation of I is provided to one input of a summing amplifier 130 and one input to a differential amplifier 132 and to a polarity sensor 134. Similarly, the analog representation of Q is provided to the second input of the summing amplifier 130, the differential amplifier 132, and to another polarity sensor 136. The output of the summing amplifier 132 is provided to a polarity sensor 138 and likewise the output of the differential amplifier 132 is provided to another polarity sensor 140. The outputs of the two polarity sensors 138 and 140 are provided to two inputs of an identity sensor 142. The outputs X and Y of the polarity sensors 134 and 136 make up the most significant bit and intermediate bit of the phase angle representation, respectively. In addition, the output Z of the identity sensor 142 makes up the least significant bit thereof. A clock signal is provided from a conventional digital clock over signal line 144 to each of the polarity sensors 134, 136, 138, and 140 for the purposes of updating the outputs thereof in accordance with some predetermined sampling interval.

In operation, the polarity sensors 134 and 136 upon being enabled by the clock signal 144 provide the digital signals for the X and Y bits of the gray coded resolved phase angle word. For example, if the analog value of I is positive, the output status of the bit X may be defined as zero; and likewise, if the polarity of the analog value of I is negative, the status of the X bit may be rendered a one. The polarity of the sum and difference of the analog signals representing the I and Q components are determined by the polarity sensors 138 and 140, respectively, the outputs of which being updated synchronously with the polarity sensors 134 and 136 by the clock signal 144. The identity sensor 142 performs a similar function as that of the identity sensor 108 as shown in FIG. 5. For example, if the polarities of the outputs of 138 and 140 are equal the least significant bit Z may be rendered a zero and conversely, if the polarities are not equal the output may be rendered a one. Thus, as the analog representations of the I and Q components are varying with time, the digital Gray format representations of the measured phase angles are being sampled in a timely fashion as determined by the clock signal 144.

The implementation of the functions in the analog embodiment described in connection with FIG. 6 may be performed with conventional analog circuitry. For example, the summing amplifier and differential amplifier may be nothing more than operational amplifier circuit configurations well known to any one skilled in the pertinent art. Likewise, the polarity sensors may be constructed of an analog comparator having a digital latching gate such as a D-flip flop, for example, for updating its output in accordance with the pulse clock signal 144. The identity sensor 142 may be nothing more than an exclusive OR gate as the case may be. All of the circuitry configurations just described are considered conventional within the sate-of-the-art and the details of which in no way form any part of the invention disclosed herein.

I claim:

1. In a radar which is operative to transmit signals comprising a train of sub-pulses with a predetermined phase-coded pattern and which derives the in-phase (I) and quadrature (Q) components of the received echo signals with respect to a local reference oscillator, said receiver utilizing phase discrimination constant false alarm rate (CFAR) techniques for detection of desired echo signals in the presence of undesired interference, the improvement being a system comprising:

a phase angle sensor for measuring the phase angle of said received echo signal with respect to said local reference oscillator as one of at least eight predetermined phase angle representations based on the relative polarity and magnitude of the derived I and Q vector components of the received echo signals;

means for sampling the measured phase angle representations of the received echo signals at times corresponding to the sub-pulse spacing of the phase-coded pattern of the transmitted signals;

first means for deriving the difference in phase angle representations between that sampled and that transmitted for the corresponding sub-pulses of the phase-coded pattern of the transmitted signals;

second means for deriving the sine and cosine values of the derived difference in phase angle representations for said sub-pulses of the phase-coded pattern;

means for accumulating the derived sine values corresponding to the sub-pulses of the phase coded pattern and for accumulating the derived cosine values corresponding to the sub-pulses of the phase coded pattern; and third means for deriving a signal which is representative of a correlation of the measured phase pattern of the echo signal with the phase pattern transmitted based on a function of the accumulated derived sine and cosine values.

2. A system in accordance with claim 1 wherein the phase angle sensor measures the phase angle of the received echo signal as one of at least eight predetermined phase angle representations based on a systematic angular rotational assignment when encountering an ambiguous borderline condition.

3. A system in accordance with claim 2 wherein the at least eight predetermined phase angle representations correspond exclusively to phase angle increments in the phase angle interval from 0° to 360°.

4. A system in accordance with claim 3 wherein the phase angle sensor systematically selects the more clockwise phase angle increment in resolving the ambiguity in phase angle of the received echo signal when encountering a borderline condition.

5. A system in accordance with claim 3 wherein the phase angle sensor systematically selects the more counter-clockwise phase angle increment in resolving the ambiguity in phase angle of the received echo signal when encountering a borderline condition.

6. A system in accordance with claim 3 wherein the phase angle increments are evenly partitioned within the phase angle interval from 0° to 360°.

7. A system in accordance with claim 1 wherein at times when the magnitudes of the derived I and Q components are both zero, a phase angle representation is selected with substantially equal probability from a generated neutral pattern of phase angle representations, whereby a low probability of false alarm is maintained.

8. A system in accordance with claim 1 wherein the predetermined phase angle representations are a digital binary number; and wherein each of the at least eight predetermined binary numbers correspond exclusively to a phase angle increment in the phase angle interval from 0° to 360°.

9. A system in accordance with claim 8 wherein the selecting means includes a shift register for each bit of the digital phase angle binary number, each shift register having a capacity of indexed positions commensurate with the number of phase-coded sub-pulses in the transmitted signals; and wherein each shift register is synchronously clocked in time relationship to the sub-pulse spacing to incrementally input and shift the digital phase angle binary numbers therethrough in common indexed positions, whereby only the phase angle binary numbers which are derived by the phase angle sensor concurrent with the clocking time of the shift registers will be entered and utilized by the system.

10. A system in accordance with claim 9 wherein predetermined common indexed positions of the shift registers are tapped to extract the sampled digital phase angle binary numbers therefrom.

11. A system in accordance with claim 9 wherein the digital phase angle binary numbers are in Gray format; and wherein the first means is comprised of a combination of digital inverters and reorganizers which are coupled to each of the signal lines of each of the extracted digital phase angle binary numbers in Gray format to derive the difference in phase angles between that sampled and that transmitted.

12. A system in accordance with claim 8 wherein the second means is comprised of a read-only-memory for each derived difference in digital phase angle binary numbers from the first means, each read-only-memory having its registers programmed in digital formats which characterize the trigonometric sine and cosine identities of the derived differences in phase angle binary numbers which are coupled correspondingly to the address input thereof.

13. A phase angle sensor for use in a constant false alarm rate (CFAR) type radar receiver which derives the in-phase (I) and quadrature (Q) components of received radar echo signals with respect to a local reference oscillator, said sensor comprising:
means for measuring the phase angle of the vector of the received echo signal as one of four phase angle quadrants, segmented from the phase angle interval of 0° to 360° with respect to the local reference oscillator, based on the relative polarity of the I and Q components; and
means for further measuring the phase angle of the vector of the echo signal as one of the two octants of the phase angle quadrant into which the vector of the echo signal is resolved in accordance with a function based on the relationships of the I and Q echo vector components.

14. A phase angle sensor in accordance with claim 13 wherein the phase angle of the echo vector is further measured as one of the two octant phase angle segments based on the polarity of the difference of the relative magnitudes of the I and Q echo vector components.

15. A phase angle sensor in accordance with claim 13 wherein the phase angle of the echo vector is further measured as one of the two octant phase angle segments based on the state of the polarities of the sum and difference of the I and Q echo vector components.

16. A phase angle sensor in accordance with claim 13 including means for determining when the phase angle of the echo vector is at an ambiguous borderline value in the octant segmented measurement thereof; and means for systematically resolving the borderline ambiguity with a consistent angular rotational assignment of phase angle measurement when said borderline value is determined.

17. A phase angle sensor in accordance with claim 16 wherein each phase angle octant segment into which the phase angle of the echo vector is measured is characterized by a 3-bit binary number.

18. A phase angle sensor in accordance with claim 17 wherein the consistent angular rotational assignment includes the selection of the more counter-clockwise phase angle octant segment with respect to the determined borderline value of the phase angle.

19. A phase angle sensor in accordance with claim 18 wherein the 3-bit binary number is in Gray format; wherein the detection of a borderline value of the phase angle includes:
first means for detecting a zero magnitude of the I component;
second means for detecting a zero magnitude of the Q component; and
third means for detecting an equality of the relative magnitude of the derived I and Q components; and wherein the systematic resolution of the ambiguity in phase angle upon detection of a borderline value thereof includes:
first selecting means governed by said first means to select the state of the most significant bit (MSB) of the 3-bit digital Gray format based on one of the polarity of the I component and an inverted polarity of the Q component;
second selecting means governed by said second means to select the state of the intermediate bit IB of the 3-bit digital Gray format based on one of the polarity of the Q component and the polarity of the I component; and
third selecting means governed by said third means to select the state of the least significant bit (LSB) based on one of a comparison of the relative magnitude of the I and Q components, and an equality comparison of the selected states of the MSB and IB of the 3-bit digital Gray format.

20. A phase angle sensor in accordance with claim 17 wherein the consistent angular rotational assignment includes the selection of the more clockwise phase angle octant segment with respect to the determined borderline value of the phase angle.

21. A phase angle sensor in accordance with claim 20 wherein the 3-bit binary number is in Gray format; wherein the detection of a borderline value of the phase angle includes:
first means for detecting a zero magnitude of the I component;
second means for detecting a zero magnitude of the Q component; and
third means for detecting that the I component is neither equal to the normal nor inverted Q component; and wherein the systematic resolution of the ambiguity in phase angle upon detection of a borderline value thereof includes:
first selecting means governed by said first means to select the state of the most significant bit (MSB) of the 3-bit digital Gray format based on one of the polarity of the I component and an inverted polarity of the Q component;
second selecting means governed by said second means to select the state of the intermediate bit (IB) of the 3-bit digital Gray format based on one of the polarity of the Q component and the polarity of the I component; and
third selecting means governed by said third mans to select the state of the least significant bit (LSB) based on one of an equality comparison of the I component with the normal and inverted Q component, and an equality comparison of the polarities of the sum and difference of the I and Q components.

22. A phase angle sensor in accordance with claim 17 including:
 means for detecting an ambiguous condition in which both the I and Q components are substantially zero;
 an independent digital number generator for generating with substantially equal probability the eight 3-bit binary numbers which characterize the phase angle octant segments; and
 selecting means governed by said ambiguous condition detecting means to select one of the 3-bit binary numbers of the measured phase angle and the 3-bit binary number generated by said independent digital number generator to represent the phase angle.

23. In a constant false alarm rate (CFAR) type radar receiver which derives the in-phase (I) and quadrature (Q) components of received radar echo signals with respect to a local reference oscillator, a method for sensing the phase angle of the received echo vector comprising the steps of:
 measuring the phase angle of the received echo vector as one of four phase angle quadrants, segmented from the phase angle interval of 0° to 360° with respect to the local reference oscillator, based on the relative polarity the I and Q components of the echo vector; and
 further measuring the phase angle of the echo vector as one of the two octants of the phase angle quadrant into which the phase angle is resolved in accordance with a function based on the relationships of the I and Q components of the echo vector.

24. The method in accordance with claim 23 wherein the phase angle of the echo vector is further measured as one of the two octant phase angle segments based on the polarity of the difference of the relative magnitudes of the I and Q components of the echo vector.

25. The method in accordance with claim 23 wherein the phase angle of the echo vector is further measured as one of the two octant phase angle segments based on the state of the polarities of the sum and difference of the I and Q components of the echo vector.

26. The method in accordance with claim 23 including the steps of:
 determining when the phase angle of the echo vector is at an ambiguous borderline value in the octant segmented measurement thereof; and
 systematically resolving the borderline ambiguity in phase angle measurement with a consistent angular rotational assignment when said borderline value is determined.

27. The method in accordance with claim 26 further including the step of characterizing each phase angle octant segment into which the phase angle of the echo vector is measured by a 3-bit digital binary number.

28. The method in accordance with claim 27 wherein the consistent angular rotational assignment includes selecting the more counter-clockwise phase angle octant segment with respect to the determined borderline value of the phase angle.

29. The method in accordance with claim 28 wherein when the digital binary number is in Gray format, the step of detecting a borderline value of the phase angle further includes:
 detecting a zero magnitude of the I component;
 detecting a zero magnitude of the Q component; and
 detecting an equality of the relative magnitude of the derived I and Q components; and wherein the step of systematically resolving the ambiguity in phase angle measurement upon detection of a borderline value further includes:
 governing the selection of one of the polarity of the I component and an inverted polarity of the Q component as the state of the most significant bit (MSB) of the 3-bit digital Gray format based on said detection of a zero magnitude of the I component;
 governing the selection of one of the polarity of the Q component and the polarity of the I component as the state of the intermediate bit (IB) of the 3-bit digital Gray format based on said detection of a zero magnitude of the Q component; and
 governing the selection of one of a comparison of the relative magnitudes of the I and Q components, and an equality comparison of the selected states of the MSB and the IB of the 3-bit digital Gray format as a basis for determining the state of the least significant bit (LSB) based on the detection of equality of the relative magnitudes of the derived I and Q components.

30. The method in accordance with claim 27 wherein the consistent angular rotational assignment includes selecting the more clockwise phase angle octant segment with respect to the determined borderline value of the phase angle.

31. A phase angle sensor in accordance with claim 30 wherein when the digital binary number is in Gray format the step of detecting a borderline value of the phase angle further includes:
 detecting a zero magnitude of the I component;
 detecting a zero magnitude of the Q component; and
 detecting that the I component is neither equal to the normal nor inverted Q component;
and wherein the step of systematically resolving the ambiguity in phase angle measurement upon detection of a borderline value further includes:
 governing the selection of one of the polarity of the I component and an inverted polarity of the Q component as the state of the most significant bit (MSB) of the 3-bit digital Gray format based on said detection of a zero magnitude of the I component;
 governing the selection of one of the polarity of the Q component and the polarity of the I component as the state of the intermediate bit (IB) of the 3-bit digital Gray format based on said detection of a zero magnitude of the Q component; and
 governing the selection of one of an equality comparison of the I component with the normal and inverted Q component, and on equality comparison of the polarities of the sum and difference of the I and Q components as a basis for determining the state of the least significant bit (LSB) based on the detection that the I component is neither equal to the normal or inverted Q component.

32. The method in accordance with claim 27 including the steps of:
 detecting an ambiguous condition in which both the I and Q vector components are substantially zero;
 generating with substantially equal probability the eight 3-bit digital binary numbers which characterize the phase angle octant segments by an independent digital number generator; and
 selecting one of the 3-bit digital binary numbers characterizing the measured phase angle and the 3-bit digital binary numbers generated by said independent digital number generator to represent the phase angle of the echo vector based on the detection of said ambiguous condition.

* * * * *